(12) United States Patent
Himayat et al.

(10) Patent No.: US 11,792,113 B2
(45) Date of Patent: Oct. 17, 2023

(54) INFORMATION CENTRIC NETWORK DYNAMIC COMPUTE ORCHESTRATION

(71) Applicant: Intel Corporation, Santa Clara, CA (US)

(72) Inventors: Nageen Himayat, Fremont, CA (US); Srikathyayani Srikanteswara, Portland, OR (US); Krishna Bhuyan, Sammamish, WA (US); Daojing Guo, Santa Clara, CA (US); Rustam Pirmagomedov, Oulu (FI); Gabriel Arrobo Vidal, Hillsboro, OR (US); Yi Zhang, Portland, OR (US); Dmitri Moltchanov, Tampere (FI)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 17/598,115

(22) PCT Filed: Jul. 2, 2020

(86) PCT No.: PCT/US2020/040761
§ 371 (c)(1),
(2) Date: Sep. 24, 2021

(87) PCT Pub. No.: WO2021/007115
PCT Pub. Date: Jan. 14, 2021

(65) Prior Publication Data
US 2022/0158934 A1   May 19, 2022

Related U.S. Application Data

(60) Provisional application No. 63/046,952, filed on Jul. 1, 2020, provisional application No. 62/870,971, filed on Jul. 5, 2019.

(51) Int. Cl.
*H04L 45/00* (2022.01)
*H04L 45/745* (2022.01)
(Continued)

(52) U.S. Cl.
CPC ............ *H04L 45/26* (2013.01); *H04L 45/745* (2013.01); *H04L 47/28* (2013.01); *H04L 47/31* (2013.01)

(58) Field of Classification Search
CPC ....... H04L 45/26; H04L 45/745; H04L 47/28; H04L 47/31; H04L 67/563; H04L 67/568; H04L 67/51; H04L 45/02; H04L 67/10
See application file for complete search history.

(56) References Cited

U.S. PATENT DOCUMENTS 9,781,033 B2 * 10/2017 Shailendra .............. H04L 45/74
10,164,910 B2 * 12/2018 Ravindran .............. H04L 67/63
(Continued)

FOREIGN PATENT DOCUMENTS

DE      112020003252        4/2022
EP         2785017 A1      10/2014
WO    WO-2021007115 A1     1/2021

OTHER PUBLICATIONS

"International Application Serial No. PCT/US2020/040761, international Search Report dated Oct. 15, 2020", 3 pgs.
(Continued)

*Primary Examiner* — Afshawn M Towfighi
(74) *Attorney, Agent, or Firm* — Schwegman Lundberg & Woessner, P.A.

(57) ABSTRACT

Systems and methods for dynamic compute orchestration include receiving, at a network node of an information centric network, a first interest packet comprising a name field indicating a named function and one or more constraints specifying compute requirements for a computing
(Continued)

node to execute the named function, the first interest packet received from a client node. A plurality of computing nodes are identified that satisfy the compute requirements for executing the named function. The first interest packet is forwarded to at least some of the plurality of computing nodes. Data packets are received from at least some of the plurality of computing nodes in response to the first interest packet. One of the plurality of computing nodes is selected based on the received data packets, and a second interest packet is sent to the selected one of the plurality of computing nodes instructing the selected one of the plurality of compute nodes to execute the named function.

24 Claims, 7 Drawing Sheets

(51) Int. Cl.
*H04L 47/28* (2022.01)
*H04L 47/31* (2022.01)

(56) References Cited

U.S. PATENT DOCUMENTS

| | | | |
|---|---|---|---|
| 10,244,071 B2* | 3/2019 | Moustafa | H04L 45/04 |
| 10,924,540 B2* | 2/2021 | Compagno | H04L 67/10 |
| 2016/0043963 A1 | 2/2016 | Oran | |
| 2022/0141708 A1* | 5/2022 | Arrobo Vidal | H04L 69/22 |
| | | | 370/329 |

OTHER PUBLICATIONS

"International Application Serial No. PCT/US2020/040761, Written Opinion dated Oct. 15, 2020", 5 pgs.

Inayat, Ali, et al., "Anchor-Less Producer Mobility Management in Named Data Networking for Real-Time Multimedia", Hindawi, Mobile Information Systems vol. 2019, (May 13, 2019), 1-22.

Krol, Michal, et al., "NFaaS: named function as a service", In Proceedings of the 4th ACM Conference on Information-Centric Networking. ACM, (Sep. 28, 2017), 134-144.

Salman, Au, et al., "Network Challenges for Cyber Physical Systems with Tiny Wireless Devices: A Case Study on Reliable Pipeline Condition Monitoring", Sensors vol. 15, (Mar. 25, 2015), 7172-7205.

"International Application Serial No. PCT US2020 040761, International Preliminary Report on Patentability dated Jan. 20, 2022", 8 pgs.

"Edge Computing with RICE, UCLA ICN-WEN presentation", (Dec. 5, 2018), 15 pgs.

Krol, Michal, "Rice: Remote method invocation in icn", Network Systems Research and Design, (2018), 39 pgs.

Moll, Philipp, "Adaptive forwarding of persistent interests in named data networking", ICN '17, (2017), 2 pgs.

Moll, Philipp, "Investigation of push-based traffic for conversational services in Named Data Networking", 2017 IEEE International Conference on Multimedia and Expo Workshops (ICMEW), (Jul. 2017), 6 pgs.

Tsilopoulos, Christos, "Supporting diverse traffic types in information centric networks", (2011), 6 pgs.

* cited by examiner

INFORMATION CENTRIC NETWORK DYNAMIC COMPUTE ORCHESTRATION

PRIORITY CLAIM

This application is a U.S. National Stage Application under 35 U.S.C. 371 from International Application No. PCT/US2020/040761, filed Jul. 2, 2020, published as WO 2021/007115, which claims the benefit of priority to U.S. Provisional Application Ser. No. 62/870,971, filed Jun. 5, 2019, and to U.S. Provisional Application Ser. No. 63/046,952, filed Jul. 1, 2020, all of which are incorporated herein by reference in their entirety.

TECHNICAL FIELD

Embodiments described herein generally relate to information centric networking (ICN), and in particular, to dynamic compute in ICN networks.

BACKGROUND

Information Centric Networking (ICN) is a networking architecture that accesses content by name, which is a paradigm shift from conventional networking architecture, which is based on Internet Protocol (IP). With IP networks, communication is host-to-host and content delivery relies on sessions between two end points.

Named Data Networking (NDN) is a widely used flavor of ICN in which an interest packet is sent to request a specific piece of data identified by its name (and not an IP address or other location). Nodes that have the content, respond with a data packet. Similarly, Named Function Networking (NFN) and Named Function as a Service (NFaaS) (collectively referred to as NFN herein) are two extensions to ICN that enable name-based remote function execution. Similar to NDN, an interest packet is sent out to request execution of a function identified by its name (rather than location).

Parameter passing is an important consideration in NFN. Generally, useful functions operate upon data sets, which are sometimes large, that are passed to the function as arguments or parameters. For example, to transcode a video feed from a mobile camera involves transferring data on the order of a few megabytes.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
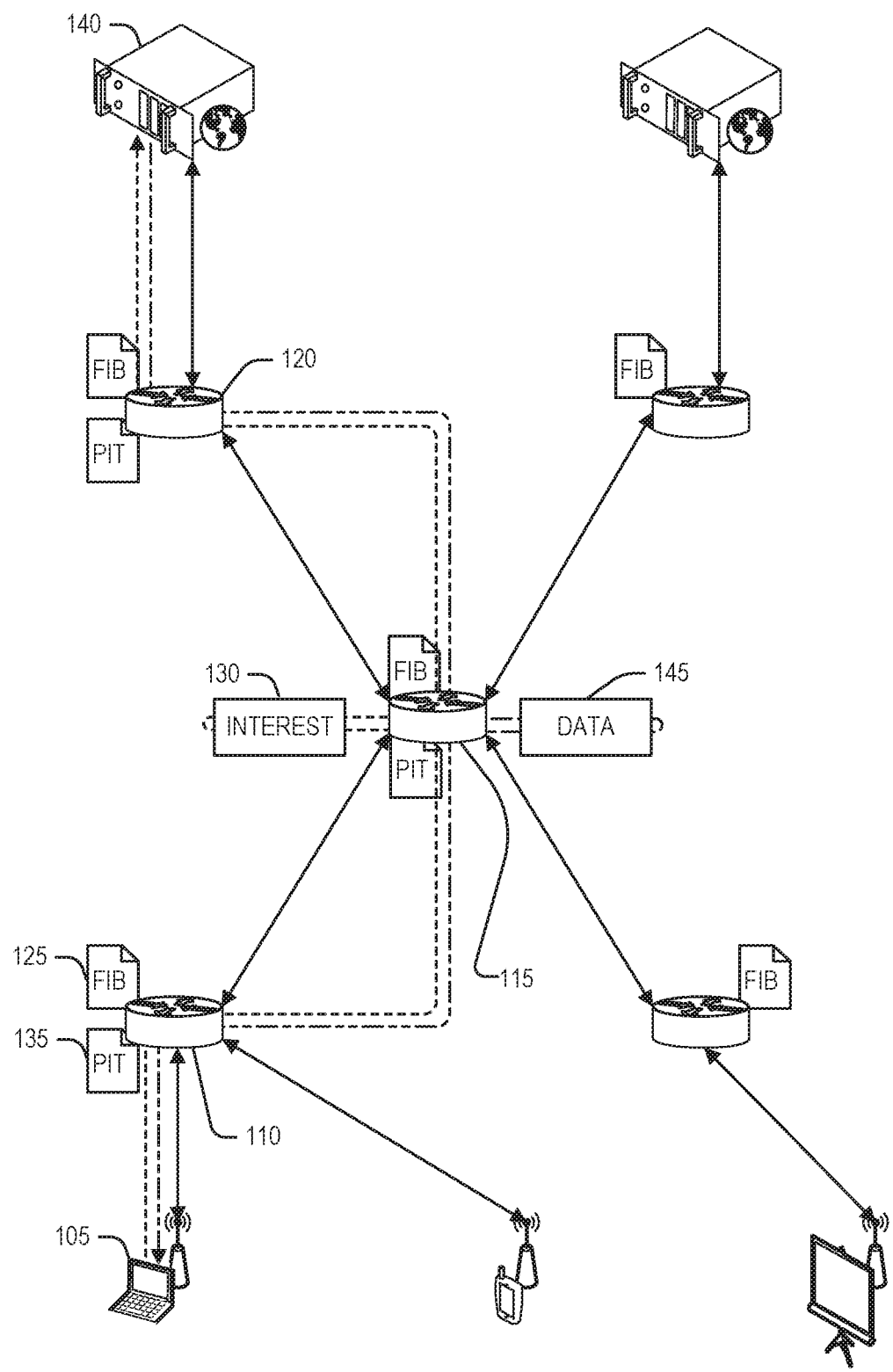
FIG. 1 illustrates an example ICN, according to an embodiment.

Systems and methods are disclosed herein for dynamic compute orchestration in information centric networking (ICN). Named Data Networking (NDN) is a popular flavor of ICN to orchestrate dynamic (e.g., edge) computing and just-in-time provisioning of compute. Compute orchestration in NDN is generally based on using a single compute server. In these cases, there is no ambiguity as to routing interest packets for computations because there is only one server in the vicinity. Some NDN mechanisms for ICN computation include Remote invocation over ICN (RICE) and Named Data Network-Remote Procedure Call (NDN-RPC).

RICE operates by modifying the routing tables and network timers of intermediate nodes in ICN based on the packets sent by the client and the client has no input as to which server performs the computation, which may raise security and data privacy considerations. There is also no guarantee that the computation will be performed by the most capable server, and multiple servers may end up performing the same computations if an interest packet is delayed in reaching its destination.

NDN-RPC solves some of these issues associated with RICE but is designed for a single server and generally does not support multi-server scenarios. NFN focuses on using lambda calculus to reduce and decompose functions but generally does not address orchestration of multi-server compute. Further, many of these techniques do not enable a client to have input as to how (e.g., what algorithm, what security levels, etc.) or where the computations are executed.

To address these issues, the techniques described herein enable a client to select a desired server to perform the computation when there are multiple servers capable of performing the computations in close vicinity (e.g., within a tolerable latency, number of hops, etc.). In an example, the network may make that selection based on compute constraints provided by the client. An interest and data exchange may be used that enables such compute node selections to be based on priorities of the requesting node. Further, the requesting node may receive the results even if the requesting node moves to a different network after the computation has started.

In an example, the node requesting the computation sends out a discovery interest packet for the function along with relevant details about the data (e.g. size of data and other parameters that may impact computation time). The network nodes may track the discovery packet using a discovery prefixes table to facilitate multiple responses for the single interest. The discovery interest packet may be routed to all servers in the vicinity which respond with data packets that indicate, for example, respective computation times. The client receives these multiple data packets and, using the information from the data packets, may select a server to perform the computation. The client may then send an updated interest packet with the selected server indicated for performing the function.

ICN compute orchestration has significant advantages. Intelligence and compute are moving to the edge. On the compute front, function-as-a-service (FaaS), which enables distributed implementation of compute, is becoming more common. However, the software and hardware provisioning for these systems is largely static and centralized. This is not conducive to the dynamic and distributed nature of the compute required at the edge. In contrast, the compute orchestration and provisioning techniques over ICN described herein are distributed and dynamic. For example, if the client that requests the computation moves to another base station or access point (AP), or to a different network entirely prior to the results becoming available, the client may still access the results of the earlier request seamlessly. Also, by enabling the client to choose a desired server within the ICN framework, the client is given more control on where the function is executed improving security and efficiency.

FIG. 1 illustrates an example ICN, according to an embodiment. ICNs operate differently than traditional host-based (e.g., address-based) communication networks. ICN is an umbrella term for a networking paradigm in which information and/or functions themselves are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 105 (e.g., subscriber) requests named content from the network itself. The content request may be called an interest and transmitted via an interest packet 130. As the interest packet traverses network devices (e.g., network elements, routers, switches, hubs, etc.)—such as network elements 110, 115, and 120—a record of the interest is kept, for example, in a pending interest table (PIT) at each network element. Thus, network element 110 maintains an entry in its PIT 135 for the interest packet 130, network element 115 maintains the entry in its PIT, and network element 120 maintains the entry in its PIT.

When a device, such as publisher 140, that has content matching the name in the interest packet 130 is encountered, that device 140 may send a data packet 145 in response to the interest packet 130. Typically, the data packet 145 is tracked back through the network to the source (e.g., device 105) by following the traces of the interest packet 130 left in the network element PITs. Thus, the PIT 135 at each network element establishes a trail hack to the subscriber 105 for the data packet 145 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 130 traverses the ICN, ICN network elements will generally attempt to match the name to a greatest degree. Thus, if an ICN element has a cached item or route for both "www-.somedomain.com or videos" and "www.somedomain.com or videos or v8675309," the ICN element will match the later for an interest packet 130 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 130 to data cached in the ICN element. Thus, for example, if the data 145 named in the interest 130 is cached in network element 115, then the network element 115 will return the data 145 to the subscriber 105 via the network element 110. However, if the data 145 is not cached at network element 115, the network element 115 routes the interest 130 on (e.g., to network element 120). To facilitate routing, the network elements may use a forwarding information base 125 (FIB) to match named data to an interface (e.g., physical port) for the route. Thus, the FIB 125 operates much like a routing table on a traditional network device.

In an example, additional meta-data may be attached to the interest packet 130, the cached data, or the route (e.g., in the FIB 125), to provide an additional level of matching. For example, the data name may be specified as "www.somedomain.com or videos or v8675309," but also include a version number—or timestamp, time range, endorsement, etc. In this example, the interest packet 130 may specify the desired name, the version number, or the version range. The matching may then locate routes or cached data matching the name and perform the additional comparison of meta-data or the like to arrive at an ultimate decision as to whether data or a route matches the interest packet 130 for respectively responding to the interest packet 130 with the data packet 145 or forwarding the interest packet 130.

ICN has advantages over host-based networking because the data segments are individually named. This enables aggressive caching throughout the network as a network element may provide a data packet 130 in response to an interest 130 as easily as an original author 140. Accordingly, it is less likely that the same segment of the network will transmit duplicates of the same data requested by different devices.

Fine grained encryption is another feature of many ICN networks. A typical data packet 145 includes a name for the data that matches the name in the interest packet 130. Further, the data packet 145 includes the requested data and may include additional information to filter similarly named data (e.g., by creation time, expiration time, version, etc.). To address malicious entities providing false information under the same name, the data packet 145 may also encrypt its contents with a publisher key or provide a cryptographic hash of the data and the name. Thus, knowing the key (e.g., from a certificate of an expected publisher 140) enables the recipient to ascertain whether the data is from that publisher 140. This technique also facilitates the aggressive caching of the data packets 145 throughout the network because each data packet 145 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 2:
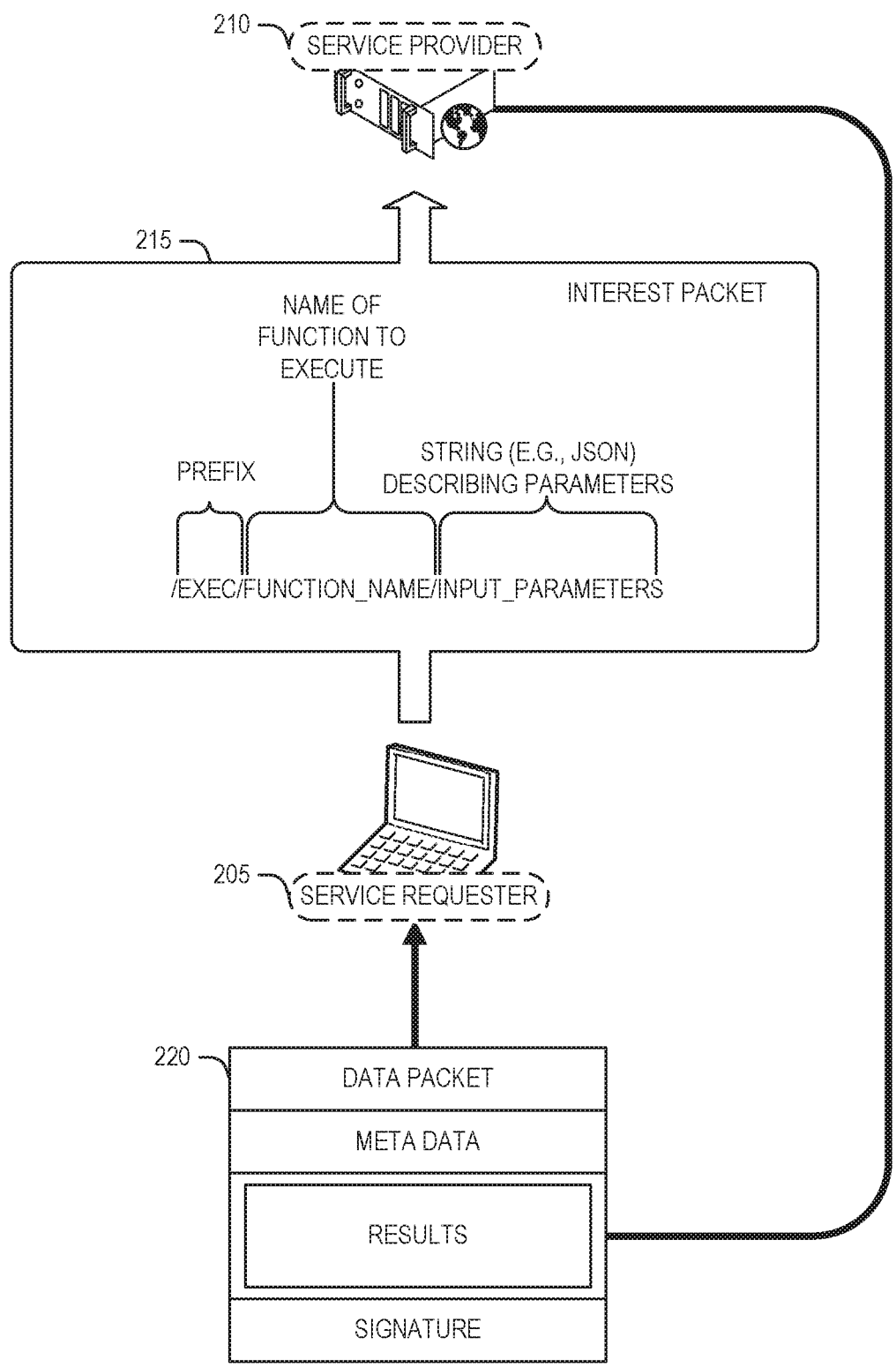
FIG. 2 illustrates an example of an ICN environment to execute a function at a remote node, according to an embodiment.

FIG. 2 illustrates an example of an ICN environment to execute a function at a remote node, according to an embodiment. ICN-based remote function execution techniques may perform remote function execution by dynamically resolving functions within a network. For example, a function parameter may be passed as a special field or meta data in an interest packet 215. In an example, a handshaking mechanism to transfer function parameters in a special data packet may be used.

In an NFN, a service requestor node 205 sends the interest packet 215 with the function name to be executed. In an example, the interest packet 215 contains all the necessary input parameters for the function. Upon receiving the interest packet 215, a forwarding node checks whether it will be able to perform the function—e.g., does the forwarding node have the function executable stored locally and enough compute resources available. If so, the forwarding node becomes the service provider 210 and it instantiates the function with the input parameters received in the interest packet 215. Once execution is complete, results are returned to the service requestor 205 as a data packet 220 following standard ICN practice.

Because the service provider node 210 may be able to simultaneously execute multiple functions—e.g., on different virtual machines or containers—system utilization for the service provider node 210 may vary from moment to moment. Thus, depending on the service provider node's load and minimum resource requirements of a requested function, the service provider node 210 may not be able to execute a function at a given time.

In an example, due to the dynamics of system utilization, it may not be efficient to share such load information periodically to the service requestor 205 because the load information soon may become obsolete. In this case, a pro-active query mechanism may be used to fetch, by a service requestor node 205, available function implementations or associated meta data from the service provider node 210. Such meta data may include such things as estimated execution time, output specifications, function version, and the like. In an example, the query mechanism is implemented as a standalone method. This method has a well-defined interface to a service requestor application running on the service requestor node 205. In an example, the query mechanism is implemented as an underlying method for existing NFN frameworks. Here, the mechanism may be triggered upon reception of an NFN interest packet at the service provider node 210 and remains transparent to other NFN procedures.

In an example, the interest packet name has three parts. The first part is a prefix for function execution. Although any prefix may be used that the service provider node 210 understands to be a function execution interest, the illustrated example is "/EXEC." The second part of the name is the requested function name (e.g., name of the function to execute).

The third part of the name is a specification of the input parameters. In an example, the specification of the input parameters may be a high-level specification of the input parameters. The high-level specification of the input parameters may be details about each function parameter. Such details may include a type of input data or a size of input data. In an example, if the input data is small enough (e.g., below a threshold) then the input data itself may be included. In an example, the high-level specification is a string serialized version of multiple data fields. An example of such a structure is the JavaScript Object Notation (JSON) string format.

In an example, the interest packet 215 may include a name of the publisher field. For example, while some service requester nodes may not care (e.g., do not have a restriction on) which function implementation is used, other nodes may be restricted as to which implementation is used. Different publishers (e.g., function implementers or requesters) also may want the input parameters formatted in a certain way. Accordingly, including the name of the publisher in the interest packet 215 may be used to provide these distinctions to the service provider node 210.

In an example, the interest packet 215 may include a required completion time field. This field helps to save a transmission from the service provider node 210 if it determines the expected execution time is greater than the required time. For machine learning (ML)-based functions—such as those implemented by an artificial neural network (ANN)—additional sub-fields may be used to specify an error tolerance level, a minimum number of gradient iterations, a max batch size, etc., many of which may also inform the function execution time. In an example, an ML architecture may be specified. For example, the number of ANN layers to use. In an example, the service provider node 210 may respond with ML options that, perhaps, detail tradeoffs between option in terms of their accuracy or their execution time.

In an example, the interest packet 215 may include a security requirement field. For example, some computations for the service requestor 10 may contain sensitive information (e.g., other people's data, protected government data, etc.). In these circumstances, security guarantees for execution, such as executing the function on a secure enclave, may be required by the service requestor node 205. By including it in the admission probe interest packet 215, the service provider node 210 may be able to reject the request before the input data is sent.

Upon reception of the interest packet 215, the service provider node 210 checks its function store and determines available implementations of the requested functions. The available implementations may be provided by different publishers, or may vary in version, or type. Type, here, refers to various options, such as, a single-threaded or multi-threaded implementation, a memory-optimized or CPU-intensive version, different output specifications etc. If the service provider node 210 is able to execute the function, it does, possible caching the result, and returns the result in the data packet 220. Otherwise, the interest packet 215 is forwarded on to another compute node in accordance with ICN or NFN procedure.

Figure 3:
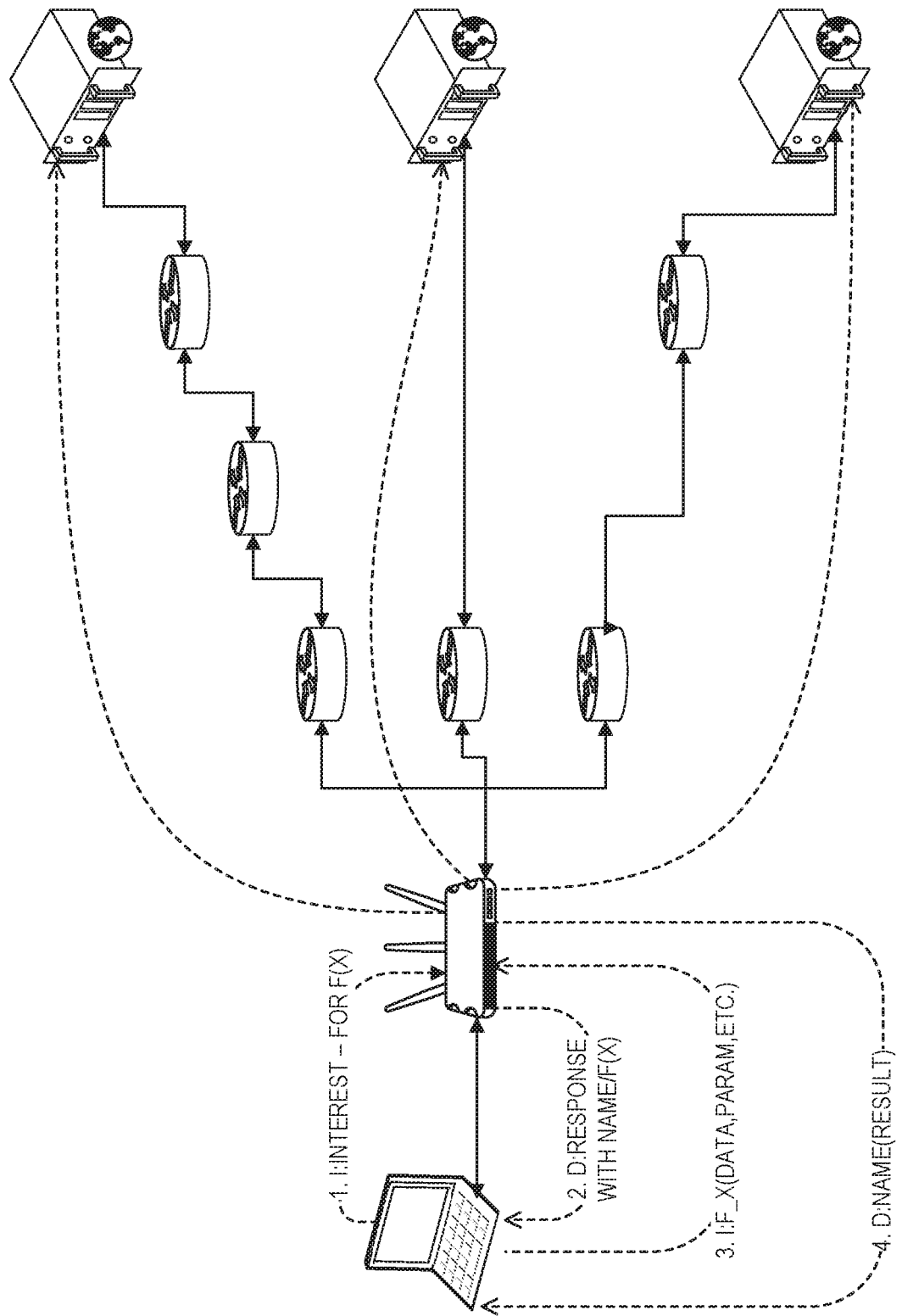
FIG. 3 is an example of a data flow to orchestrate remote compute in an ICN, according to an embodiment.

FIG. 3 is an example of a data flow to orchestrate remote compute in an ICN, according to an embodiment. The description below makes the following assumptions: (1) The network is capable of decoding ICN (e.g., NDN) messages. (2) Each function has a unique name. For instance, if two different publishers create a function that does image recognition, the functions may be called john/image_recognition and jim/image_recognition. This way, if the client is interested in a specific implementation of a function, if the client is aware of the name of the function, the function may be requested. If the functions are not well known a priori, it is assumed there is a directory service application from where the layout of the name space may be requested. (3) The routing tables, Forwarding Information Bases (FIBs), are assumed to be aware of the compute servers in the vicinity.

In FIG. 3, the client node (illustrated as a laptop) requests function F(x) to be performed on data. In an example, the client node has the data. In an example, the client node does not have the data. If the client node does not have the data, the client node may request that data from the network. In an example, the client node uses a unique name of the data as a parameter to F(x). The server (e.g., a compute node) may then request that data from the network to perform the computation. In any case, the data is delivered to the compute node that then performs the computation and delivers the result to the client node.

In an example, the client node selects which of several available compute nodes to use. In an example, the multi-node compute orchestration operates as follows:

First, the client node transmits an interest packet with a name such as "john/F(x)". If no specific publisher of F(x) is given, then the interest is sent to compute nodes that might have any version of F(x). The interest packet also contains information about the requested compute—for instance in this case, the size of the image. The parameters of the function that determines its compute time may also be part of the interest packet. Additionally, other constraints that the client may specify may also be part of the interest packet. Examples of these constraints may include the minimum security level needed at the server, the number of hops or a geographical area that defines how far an interest packet may be sent, etc. In an example, a flag in the interest packet is added that indicates multiple responses may be received for the interest packet (see FIG. 5).

The network forwards the interest packet to all compute nodes that meet the constraints of the interest packet. In an example, when the flag is set to receive multiple responses, the pending interest table (PIT) entries are not erased when a response is sent—rather the PIT entry is erased upon the timeout given in the interest packet or upon a designated number of responses received. This may be accomplished using a discovery prefixes table as discussed with respect to FIG. 4.

Second, the compute nodes that are willing to perform the compute return a data packet with details on how to reach the responding compute node server. For instance, server1 that implements "john/F(x)" may send a data packet with the time it will take to complete the computation and the unique name to reach server1. For instance, "server1/john/F(x)".

Third, the client node selects which server to use based on the client node's local policy and the data packets it receives. For instance, the client node may use the first response it receives. Alternately, the client node may choose the lowest execution time, the closest node, or the like. Once the client node selects a compute node, the client node sends an interest packet, for example, with the name "server1/john/F(x)" along with the data for that computation.

Fourth, once the selected compute node receives the interest packet, the compute node sends a data packet with the information on the name of the result and an estimated time when the result will be available. For instance, server 1 may respond with a name for the result as "server1/john/F(x)/results/data1". Once the data is expected to be ready, the client node transmits an interest packet for the results. The client node may be on a different network, but since the results have a unique name, the data will be routed to the correct location regardless of the locations of the respective client node and compute node.

In an example, the network selects which of several available compute nodes to use. In this example, the client node transmits an interest packet requesting F(x) and provides details of constraints and information about data size etc. However, in this case, the network makes the decision on which compute node to forward the interest packet and returns only one data packet to the client with details about how to send the data and other information in the following interest packet. The PIT entry is erased as soon as one response is obtained like traditional ICN.

Figure 4:
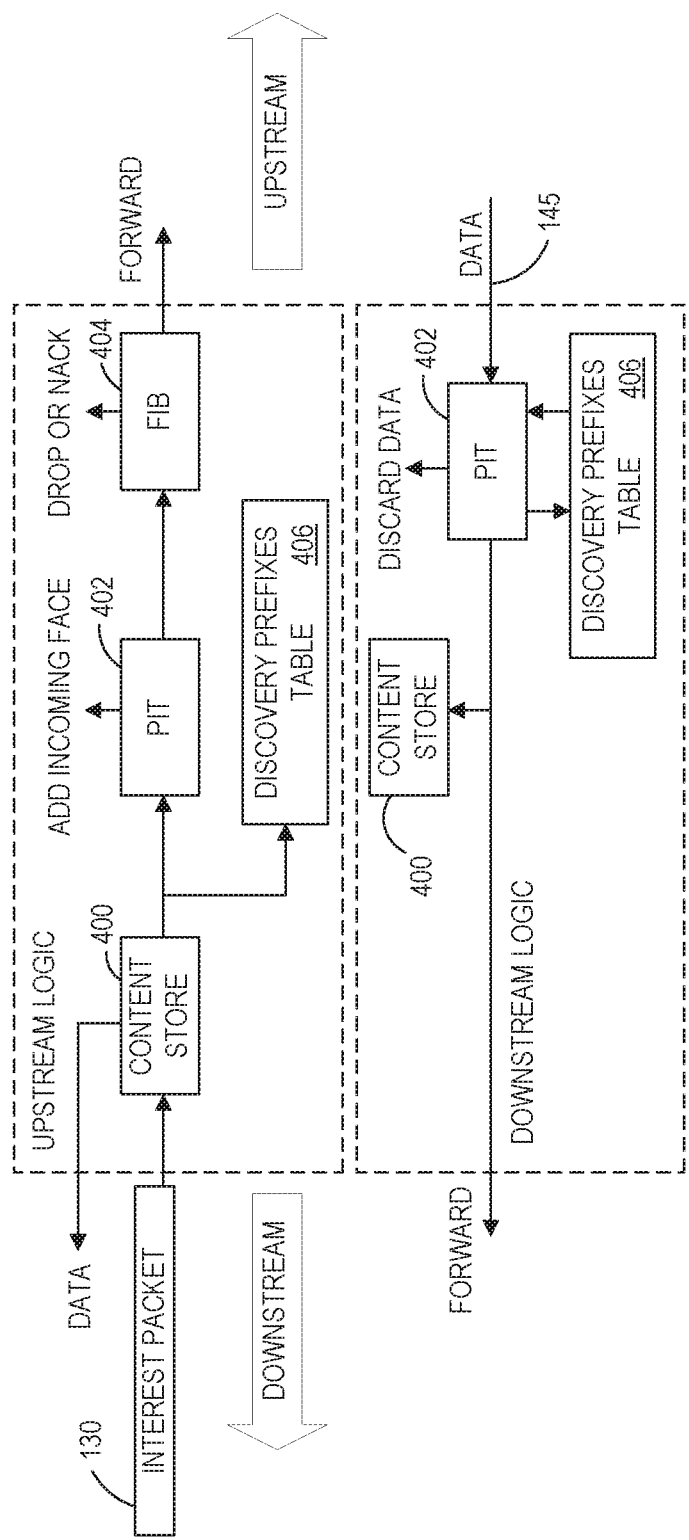
FIG. 4 is a diagram illustrating example packet and data flow for a node of an ICN network that includes a discovery prefixes table.

In the example in which the client node makes the decision on which compute node to use, additional software and intelligence for sorting through the requests and making the decision does not have to be installed on every ICN node. Instead, only the client nodes that intend to request computations have this layer. This technique is also more suited for ad-hoc networks where the next node from the client may not be an access point or a base station. Rather, the next node may be a node like the client node and burdening those nodes with additional tasks—e.g., in addition to forwarding packets to the servers—may create undesirable overhead. In the second approach the client sends out the request for compute and does not have to bother with deciding which server processes the request and may be assured that the server that meets its constraints will process the request FIG. 4 is a diagram illustrating an example packet and data flow for a node of an ICN network, such as any of network elements 110, 115, and/or 120 of FIG. 1, using a discovery prefixes table. The node includes one or more content stores 400, one or more PITs 402, one or more FIBs 404, and one or more discovery prefixes tables (DPT) 406. The DPTs 406 may be used to store information regarding discovery interest packets, for example, to facilitate receipt of multiple data packets for single interest.

To retrieve data, when a node receives an interest packet 130, the node first checks whether the content is cached within the content store 400. If the content is not cached, the interest packet 130 is passed to the PIT 402 and the DPT 406. A name from the interest packet 130 is used to check whether the PIT 402 and the DPT 406 have an entry matching the name. If no match is found, the node records the interest in the PIT 402 and, if the interest packet 130 is a discovery packet, records the interest in the DPT 406 and forwards the interest packet 130 based on information in the FIB 404.

Conventional ICN architectures delete the respective PIT entry upon receipt of a corresponding data packet. However, for discovery packets, as discussed herein, it is desirable to receive multiple data packets to allow a client node or a respective computing node to select a computing node for executing a function, for example, in an NFN. Thus, upon receipt, the interest packet 130 may be checked to determine if it is a discovery packet. This may be designated by a name field, a separate discovery packet indicator field, a parameters field, or in any other way.

Figure 5:
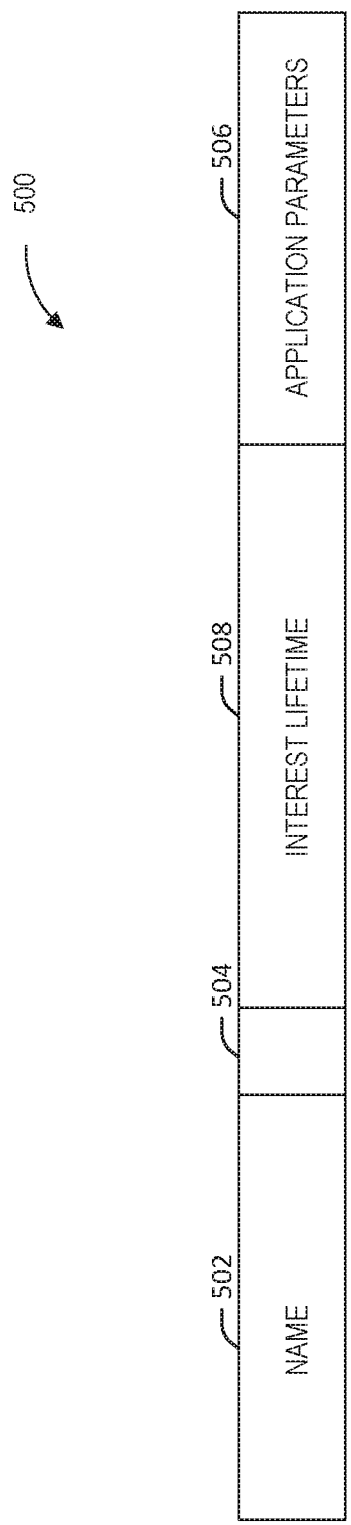
FIG. 5 is a diagram illustrating an example interest packet for an ICN network.

FIG. 5 illustrates an example interest packet 500 that includes an indication that the packet 500 is a discovery packet. The packet 500 includes a name field 502, an optional discovery indicator field 504, a parameters field 506, and an interest lifetime field 508. The packet 500 may include additional fields not illustrated in FIG. 5. The name field 502 includes a name for the function of the interest. The name field 502 also may include an indicator that the packet 500 is a discovery packet. For example, the name may include a specially allocated keyword, which can be embedded into the Interest namespace. For example, the namespace may start with a keyword prefix such as "/discovery/service/". Any name that starts with the keyword indicates that the respective packet 500 is a discovery packet. In this example, the packet 500 may not include the optional discovery indicator field 504. In another example, the application parameters field 506 may include a keyword indicating that the packet 500 is a discovery packet. In this example, the name field does not include the keyword.

In another example, the packet 500 includes the optional discovery indicator field 504 to indicate whether the packet 500 is a discovery packet. The discovery indicator field 504 may be a single bit to provide a binary indication of whether the packet 500 is a discovery packet. For example, a "1" may indicate that the packet 500 is a discovery packet while a "0"

may indicate that the packet 500 is not a discovery packet. In this example, interest aggregation may be disabled in the respective node, or the node may have logic to differentiate between packets 500 coming from different users, as the names may be the same between discovery and non-discovery packets.

A discovery interest packet 500 contains t desired number of responses the client wants to receive back, such as in the parameters field 506. The interest lifetime field 508 is used to set an amount of time for which a client wishes to wait for respective data packets in response to the discovery interest packet 500 (i.e., a timeout period). The desired number of responses and the interest lifetime are used for the PIT 402 to determine when a respective entry in the PIT 402 for the respective interest can be deleted.

Nodes, such as routers, may compare the parameters with stored policies, for example, and if the parameters are policy-compliant, the parameters can be applied to the respective entry in the PIT 402. For example, the number of responses can be decreased by a router according to the internal policy of the router. The router may employ a policy to protect the router from having PIT entries for a very long time (e.g., days, months, years, etc.), and to limit the number of responses that are sent back to the client node. The policy may also provide protection against security attacks that can flood the ICN network.

Upon determination that the interest packet 130 is a discovery packet, the node may check the DPT 406 to see if an entry already exists. If not, the respective computing node creates an entry in the DPT 406, and then may forward the interest accordingly. When data is returned while the entry in the PIT 402 has not expired, the forwarder will satisfy the interest by sending the data packet downstream and decrement the counter for the PIT entry by 1. When the counter reaches 0 (i.e., the number of data packets returned has reached the specified number of responses in the interest packet), the PIT entry is marked as expired and gets deleted. The entry in the DPT 406 may be deleted at the same time as the respective PIT entry. The counter may be stored in the DPT 406, the PIT 402, or any other location within the respective node.

Figure 6:
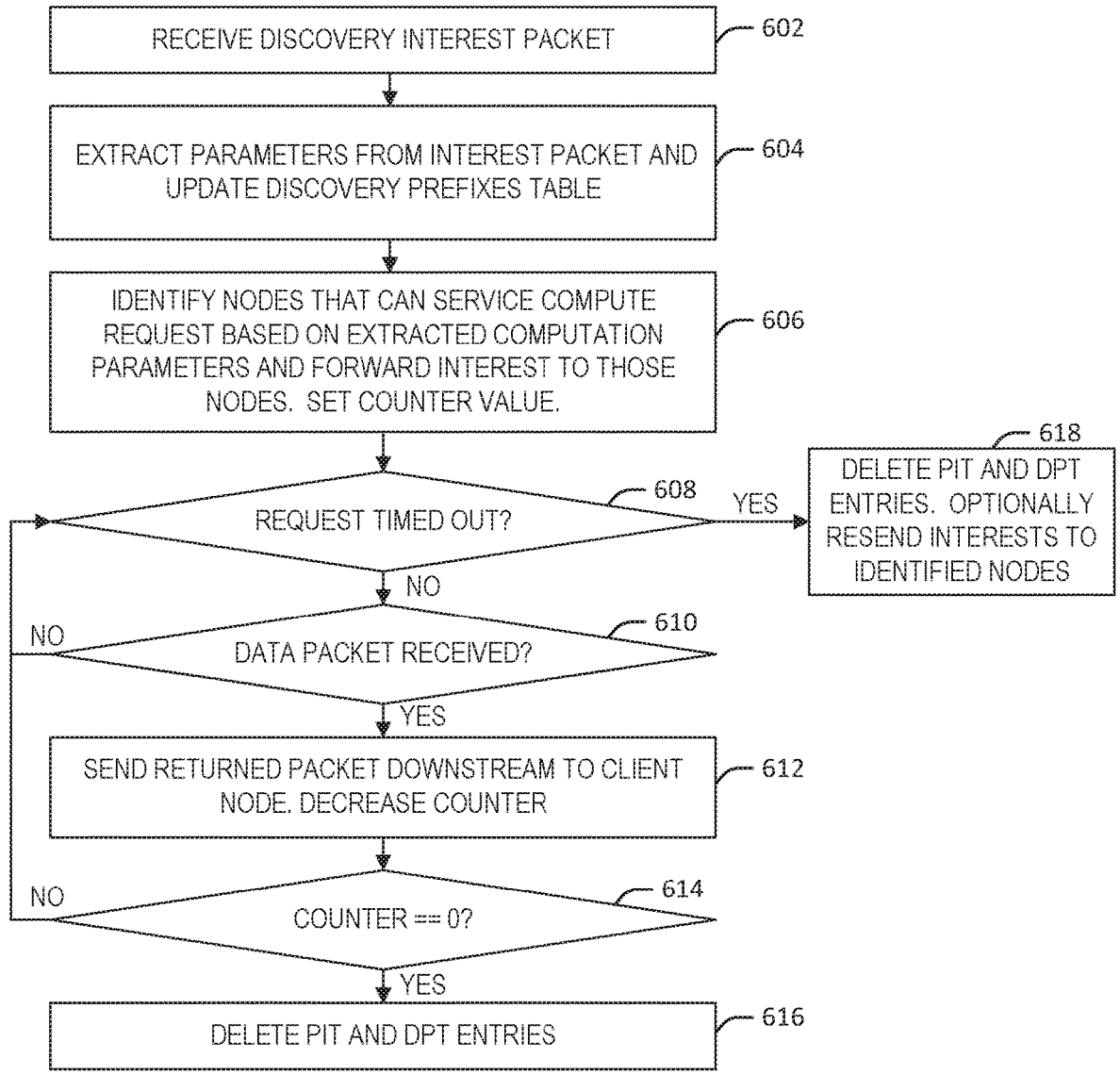
FIG. 6 is a flowchart illustrating a method of orchestrating dynamic compute in ICN networks.

FIG. 6 is a flowchart illustrating a method 600 of orchestrating dynamic compute in ICN networks by facilitating multiple data packet responses for a single interest. At step 602, a network node receives an interest packet and identifies the packet as a "discovery" interest packet. Because the packet is identified as a discovery interest packet, the network node knows that the interest may require multiple data responses. In an example, to identify the packet as a discovery packet, pre-defined keywords may be reserved for identifying a packet as a discovery interest packet. For example, the predefined keyword may be in the form of: "/discovery/service/". To avoid conflicts, these keywords may be prohibited from being assigned as the root of any other namespace. In another example, the keyword may be included in an application parameters field of the interest packet. In another example, instead of using a keyword, a field may be added to the interest packet to indicate whether the packet is a discovery interest packet. For example, the field may be a binary field such that if present, the field indicates the interest packet is a "discovery packet" and if not present, the packet can be treated by intermediary nodes as a conventional interest packet. This example permits backward compatibility for intermediary nodes that do not have the ability to identify a discovery interest packet.

At step 604, parameters are extracted from the discovery interest packet. For example, each service discovery interest may contain a desired number of responses the client wants to receive in response to the discovery interest packet. Additionally, the discovery interest packet may include an interest lifetime field indicating how long the client wishes to wait for responses to the discovery interest packet. The parameters may also include compute parameters such as the size of the data for the function and other parameters that may affect compute time. Additionally, other constraints that the client may specify may also be part of the interest packet. Examples of these constraints may include the minimum security level needed at the server, the number of hops or a geographical area that defines how far an interest packet may be sent. The network node adds an entry to its discovery prefixes table that identifies the discovery interest packet, the interest lifetime, and a count of remaining responses (initially equal to the specified desired number of responses in the interest packet). A PIT entry may be made for the interest as well. At step 606, the network node identifies and forwards the interest packet to the compute nodes that meet the constraints specified by the client in the interest packet.

The method 600 executes steps 608-614 to receive responses for the respective discovery interest packet. At step 608, if the amount of time designated by the discovery interest packet has passed, the method 600 proceeds to step 618 and deletes the PIT entry and the DPT entry for the discovery interest packet. This way, if any new data packets are returned after this time, the data packets will not be forwarded to the client node. The node may optionally resend the interest if less than a desired number of data packets were received in response to the discovery interest.

At step 610, if a data packet is received, method 600 proceeds to step 612, otherwise, method 600 returns to step 608. At step 612, the respective count of response remaining in the DPT is decremented, and the data packet is forwarded toward the client node. At step 614, if the respective count in the DPT for the discovery packet is equal to zero (the number of returned data packets is equal to the number designated by the discovery interest packet), method 600 proceeds to step 616 and the PIT entry and DPT entry are deleted. If the respective count in the DPT is not zero, method 600 returns to step 608 and continues receiving data packets for the discovery interest. This way, multiple data packets may be returned for a single interest.

Figure 7:
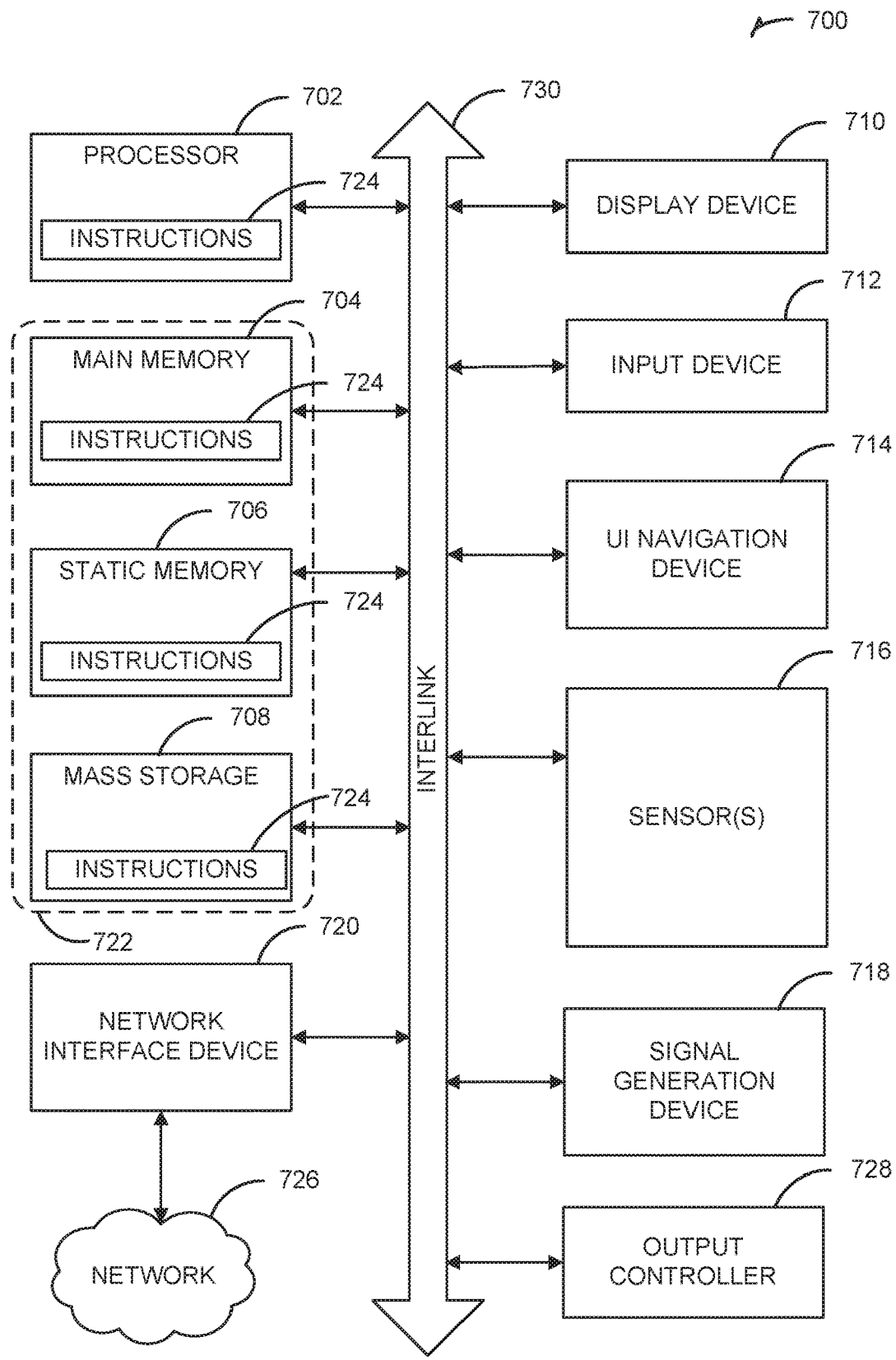
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, movable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drives, tape drives, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine In an example, information stored or otherwise provided on the machine readable medium 722 may be representative of the instructions 724, such as instructions 724 themselves or a format from which the instructions 724 may be derived. This format from which the instructions 724 may be derived may include source code, encoded instructions (e.g., in compressed or encrypted form), packaged instructions (e.g., split into multiple packages), or the like. The information representative of the instructions 724 in the machine readable medium 722 may be processed by processing circuitry into the instructions to implement any of the operations discussed herein. For example, deriving the instructions 724 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 may include assembly, compilation, or interpretation of the information (e.g., by the processing circuitry) to create the instructions 724 from some intermediate or preprocessed format provided by the machine readable medium 722. The information, when provided in multiple parts, may be combined, unpacked, and modified to create the instructions 724. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, 3GPP 4G/5G wireless communication networks), Bluetooth or IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a method for enabling dynamic compute in information centric networking (ICN), the method comprising: receiving, at a network node of an ICN network, a first interest packet comprising a name field indicating a named function and one or more constraints specifying compute requirements for a computing node to execute the named function, the first interest packet received from a client node; identifying a plurality of computing nodes that satisfy the compute requirements for executing the named function; forwarding the first interest packet to at least some of the plurality of computing nodes; receiving data packets from at least some of the plurality of computing nodes in response to the first interest packet; selecting one of the plurality of computing nodes based on the received data packets; and sending a second interest packet to the selected one of the plurality of computing nodes instructing the selected one of the plurality of compute nodes to execute the named function.

In Example 2, the subject matter of Example 1 includes, wherein selecting the one of the plurality of computing nodes that satisfy the compute requirements comprises: forwarding each of the received data packets to the client node; and receiving, from the client node, the second interest packet specifying the selected one of the plurality of computing nodes.

In Example 3, the subject matter of Examples 1-2 includes, wherein selecting the one of the plurality of computing nodes further comprises: selecting, by the network node, the one of the plurality of computing nodes based on the received data packets and a stored policy of the network node.

In Example 4, the subject matter of Examples 1-3 includes, wherein forwarding the first interest packet to each of the plurality of computing nodes comprises: storing an entry for the first interest packet in a discovery prefixes table of the network node, the entry including a count of responses and a timeout period specified by the first interest packet; and decrementing the count of responses in the discovery prefixes table of the network node upon receipt of a data packet in response to the first interest packet.

In Example 5, the subject matter of Example 4 includes, deleting the entry in the discovery prefixes table if the count reaches zero or the timeout period has elapsed.

In Example 6, the subject matter of Examples 1-5 includes, wherein receiving the first interest packet comprises: checking at least one field of the first interest packet to determine whether the interest packet is a discovery interest packet; and identifying the interest packet as a discovery interest packet based on a value of at least one field, wherein identification of the interest packet as a discovery interest packet enables the network node to receive and forward the data packets in response to the first interest packet.

In Example 7, the subject matter of Example 6 includes, wherein the at least one field is the name field, and wherein the value is a predefined keyword within the name field.

In Example 8, the subject matter of Examples 6-7 includes, wherein the at least one field is a discovery packet field comprising a single bit, and wherein identifying the first interest packet as a discovery interest packet comprises identifying the first interest packet as a discovery interest packet if the single bit indicates that the first interest packet is a discovery packet.

In Example 9, the subject matter of Examples 1-8 includes, receiving, in response to the second interest packet, a result data packet specifying a name for retrieving results of the executed named function.

Example 10 is a system for enabling dynamic compute in information centric networking (ICN), the system comprising: a client node configured to generate a first interest packet to request execution of a named function, the first interest packet comprising a name field indicating the named function and one or more constraints specifying compute requirements for a computing node to execute the named function; a network node configured to: receive the first interest packet; identify a plurality of computing nodes that satisfy the compute requirements for executing the named function; forward the first interest packet to at least some of the plurality of computing nodes; receive data packets from at least some of the plurality of computing nodes in response to the first interest packet; forwarding each of the received data packets to the client node; and receiving, from the client node, a second interest packet specifying a selected one of the plurality of computing nodes for execution of the named function.

In Example 11, the subject matter of Example 10 includes, wherein the network node is configured to forward the first interest packet to each of the plurality of computing nodes by: storing an entry for the first interest packet in a discovery prefixes table of the network node, the entry including a count of responses and a timeout period specified by the first interest packet; and decrementing the count of responses in the discovery prefixes table of the network node upon receipt of a data packet in response to the first interest packet.

In Example 12, the subject matter of Example 11 includes, wherein the network node is further configured to delete the entry in the discovery prefixes table if the count reaches zero or the timeout period has elapsed.

In Example 13, the subject matter of Examples 10-12 includes, wherein the network node is configured to receive the first interest packet by: checking at least one field of the first interest packet to determine whether the interest packet is a discovery interest packet; and identifying the interest packet as a discovery interest packet based on a value of at least one field, wherein identification of the interest packet as a discovery interest packet enables the network node to receive and forward the data packets in response to the first interest packet.

In Example 14, the subject matter of Example 13 includes, wherein the at least one field is the name field, and wherein the value is a predefined keyword within the name field.

In Example 15, the subject matter of Examples 13-14 includes, wherein the at least one field is a discovery packet field comprising a single bit, and wherein identifying the first interest packet as a discovery interest packet comprises identifying the first interest packet as a discovery interest packet if the single bit indicates that the first interest packet is a discovery packet.

In Example 16, the subject matter of Examples 10-15 includes, wherein the network node is further configured to receive, in response to the second interest packet, a result data packet specifying a name for retrieving results of the executed named function and forward the result data packet to the client node.

Example 17 is a system for enabling dynamic compute in information centric networking (ICN), the system comprising: a client node configured to generate a first interest packet to request execution of a named function, the first interest packet comprising a name field indicating the named function and one or more constraints specifying compute requirements for a computing node to execute the named function; a network node configured to: receive the first interest packet; identify a plurality of computing nodes that satisfy the compute requirements for executing the named function; forward the first interest packet to at least some of the plurality of computing nodes; receive data packets from at least some of the plurality of computing nodes in response to the first interest packet; selecting one of the plurality of computing nodes based on the received data packets; and sending a second interest packet to the selected one of the plurality of computing nodes instructing the selected one of the plurality of compute nodes to execute the named function.

In Example 18, the subject matter of Example 17 includes, wherein the network node is configured to forward the first interest packet to each of the plurality of computing nodes by: storing an entry for the first interest packet in a discovery prefixes table of the network node, the entry including a count of responses and a timeout period specified by the first interest packet; and decrementing the count of responses in the discovery prefixes table of the network node upon receipt of a data packet in response to the first interest packet.

In Example 19, the subject matter of Examples 17-18 includes, wherein the network node is further configured to delete the entry in the discovery prefixes table if the count reaches zero or the timeout period has elapsed.

In Example 20, the subject matter of Examples 17-19 includes, wherein the network node is configured to receive the first interest packet by: checking at least one field of the first interest packet to determine whether the interest packet is a discovery interest packet; and identifying the interest packet as a discovery interest packet based on a value of at least one field, wherein identification of the interest packet as a discovery interest packet enables the network node to receive and forward the data packets in response to the first interest packet.

In Example 21, the subject matter of Examples 19-20 includes, wherein the at least one field is the name field, and wherein the value is a predefined keyword within the name field.

In Example 22, the subject matter of Examples 19-21 includes, wherein the at least one field is a discovery packet field comprising a single bit, and wherein identifying the first interest packet as a discovery interest packet comprises identifying the first interest packet as a discovery interest packet if the single bit indicates that the first interest packet is a discovery packet.

In Example 23, the subject matter of Examples 17-22 includes, wherein the network node is further configured to receive, in response to the second interest packet, a result data packet specifying a name for retrieving results of the executed named function and forward the result data packet to the client node.

Example 24 is a system for enabling dynamic compute in information centric networking (ICN), the system comprising: means for receiving a first interest packet comprising a name field indicating a named function and one or more constraints specifying compute requirements for a computing node to execute the named function; means for identifying a plurality of computing nodes that satisfy the compute requirements for executing the named function; means for forwarding the first interest packet to at least some of the plurality of computing nodes; means for receiving data packets from at least some of the plurality of computing nodes in response to the first interest packet; means for selecting one of the plurality of computing nodes based on the received data packets; and means for sending a second interest packet to the selected one of the plurality of computing nodes instructing the selected one of the plurality of compute nodes to execute the named function.

In Example 25, the subject matter of Example 24 includes, wherein the means for selecting the one of the plurality of computing nodes that satisfy the compute requirements comprises: means for forwarding each of the received data packets to client node that generated the first interest packet; and means for receiving, from the client node, the second interest packet specifying the selected one of the plurality of computing nodes.

In Example 26, the subject matter of Examples 24-25 includes, wherein the means for forwarding the first interest packet to each of the plurality of computing nodes comprises: means for storing an entry for the first interest packet in a discovery prefixes table of the network node, the entry including a count of responses and a timeout period specified by the first interest packet; and means for decrementing the count of responses in the discovery prefixes table of the network node upon receipt of a data packet in response to the first interest packet.

In Example 27, the subject matter of Example 26 includes, means for deleting the entry in the discovery prefixes table if the count reaches zero or the timeout period has elapsed.

In Example 28, the subject matter of Examples 24-27 includes, wherein the means for receiving the first interest packet comprises: means for checking at least one field of the first interest packet to determine whether the interest packet is a discovery interest packet; and means for identifying the interest packet as a discovery interest packet based on a value of at least one field, wherein identification of the interest packet as a discovery interest packet enables the network node to receive and forward the data packets in response to the first interest packet.

In Example 29, the subject matter of Example 28 includes, wherein the at least one field is the name field, and wherein the value is a predefined keyword within the name field.

In Example 30, the subject matter of Examples 28-29 includes, wherein the at least one field is a discovery packet field comprising a single bit, and wherein the means for identifying the first interest packet as a discovery interest packet comprises means for identifying the first interest packet as a discovery interest packet if the single bit indicates that the first interest packet is a discovery packet.

In Example 31, the subject matter of Examples 24-30 includes, means for receiving, in response to the second interest packet, a result data packet specifying a name for retrieving results of the executed named function.

Example 32 is an apparatus comprising: one or more processors and one or more computer readable media comprising instructions that, when executed by the one or more processors, cause the one or more processors to perform operations comprising: receiving a first interest packet comprising a name field indicating a named function and one or more constraints specifying compute requirements for a computing node to execute the named function, the first interest packet received from a client node; identifying a plurality of computing nodes that satisfy the compute requirements for executing the named function; forwarding the first interest packet to at least some of the plurality of computing nodes; receiving data packets from at least some of the plurality of computing nodes in response to the first interest packet; selecting one of the plurality of computing nodes based on the received data packets; and sending a second interest packet to the selected one of the plurality of computing nodes instructing the selected one of the plurality of compute nodes to execute the named function.

In Example 33, the subject matter of Example 32 includes, wherein the operation of selecting the one of the plurality of computing nodes that satisfy the compute requirements comprises: forwarding each of the received data packets to the client node; and receiving, from the client node, the second interest packet specifying the selected one of the plurality of computing nodes.

In Example 34, the subject matter of Examples 32-33 includes, wherein the operation of selecting the one of the plurality of computing nodes comprises selecting the one of the plurality of computing nodes based on the received data packets and a stored policy.

In Example 35, the subject matter of Examples 32-34 includes, wherein the operation of forwarding the first interest packet to each of the plurality of computing nodes comprises: storing an entry for the first interest packet in a discovery prefixes table of the network node, the entry including a count of responses and a timeout period specified by the first interest packet; and decrementing the count of responses in the discovery prefixes table of the network node upon receipt of a data packet in response to the first interest packet.

In Example 36, the subject matter of Example 35 includes, the operations further comprising: deleting the entry in the discovery prefixes table if the count reaches zero or the timeout period has elapsed.

In Example 37, the subject matter of Examples 32-36 includes, wherein the operation of receiving the first interest packet comprises: checking at least one field of the first interest packet to determine whether the interest packet is a discovery interest packet; and identifying the interest packet as a discovery interest packet based on a value of at least one field, wherein identification of the interest packet as a discovery interest packet enables the network node to receive and forward the data packets in response to the first interest packet.

In Example 38, the subject matter of Example 37 includes, wherein the at least one field is the name field, and wherein the value is a predefined keyword within the name field.

In Example 39, the subject matter of Examples 37-38 includes, wherein the at least one field is a discovery packet field comprising a single bit, and wherein identifying the first interest packet as a discovery interest packet comprises identifying the first interest packet as a discovery interest packet if the single bit indicates that the first interest packet is a discovery packet.

In Example 40, the subject matter of Examples 32-39 includes, the operations further comprising receiving, in response to the second interest packet, a result data packet specifying a name for retrieving results of the executed named function.

An example implementation is an edge computing system, including respective edge processing devices and nodes to invoke or perform the operations of Examples 1-40, or other subject matter described herein.

Another example implementation is an aggregation node, network hub node, gateway node, or core data processing node, within or coupled to an edge computing system, operable to invoke or perform the operations of Examples 1-40, or other subject matter described herein.

Another example implementation is an access point, base station, road-side unit, street-side unit, or on-premise unit, within or coupled to an edge computing system, operable to invoke or perform the operations of Examples 1-40, or other subject matter described herein.

Another example implementation is an edge provisioning node, service orchestration node, application orchestration node, or multi-tenant management node, within or coupled to an edge computing system, operable to invoke or perform the operations of Examples 1-40, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of Examples 1-40, or other subject matter described herein.

Another example implementation is an edge computing system including aspects of network functions, acceleration functions, acceleration hardware, storage hardware, or computation hardware resources, operable to invoke or perform the use cases discussed herein, with use of Examples 1-40, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to European Telecommunications Standards Institute (ETSI) Multi-Access Edge Computing (MEC) specifications, operable to invoke or perform the use cases discussed herein, with use of Examples 1-40, or other subject matter described herein.

Another example implementation is an edge computing system adapted for mobile wireless communications, including configurations according to an 3GPP 4G/LTE or 5G network capabilities, operable to invoke or perform the use cases discussed herein, with use of Examples 1-40, or other subject matter described herein.

Another example implementation is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of Examples 1-40, or other subject matter described herein.

Another example implementation is networking hardware, acceleration hardware, storage hardware, or computation hardware, with capabilities implemented thereupon, operable in an edge computing system to invoke or perform the use cases discussed herein, with use of Examples 1-40, or other subject matter described herein.

Another example implementation is an edge computing system configured to perform use cases provided from one or more of: compute offload, data caching, video processing, network function virtualization, radio access network management, augmented reality, virtual reality, industrial automation, retail services, manufacturing operations, smart buildings, energy management, autonomous driving, vehicle assistance, vehicle communications, internet of things operations, object detection, speech recognition, healthcare applications, gaming applications, or accelerated content processing, with use of 1-40, or other subject matter described herein.

Another example implementation is an apparatus of an edge computing system comprising: one or more processors and one or more computer-readable media comprising instructions that, when executed by the one or more processors, cause the one or more processors to invoke or perform the use cases discussed herein, with use of Examples 1-40, or other subject matter described herein.

Another example implementation is one or more computer-readable storage media comprising instructions to cause an electronic device of art edge computing system, upon execution of the instructions by one or more processors of the electronic device, to invoke or perform the use cases discussed herein, with use of Examples 1-40, or other subject matter described herein.

Another example implementation is an apparatus of an edge computing system comprising means, logic, modules, or circuitry to invoke or perform the use cases discussed herein, with use of Examples 1-40, or other subject matter described herein.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for enabling dynamic compute in information centric networking (ICN), the system comprising:
   a client node configured to generate a first interest packet to request execution of a named function, the first interest packet comprising a name field indicating the named function and one or more constraints specifying compute requirements for a computing node to execute the named function;
   a network node configured to:
   receive the first interest packet;
   identify a plurality of computing nodes that satisfy the compute requirements for executing the named function;
   forward the first interest packet to at least some of the plurality of computing nodes;
   receive data packets from at least some of the plurality of computing nodes in response to the first interest packet;
   forwarding each of the received data packets to the client node; and
   receiving, from the client node, a second interest packet specifying a selected one of the plurality of computing nodes for execution of the named function.

2. The system of claim 1, wherein the network node is configured to forward the first interest packet to each of the plurality of computing nodes by:
   storing an entry for the first interest packet in a discovery prefixes table of the network node, the entry including a count of responses and a timeout period specified by the first interest packet; and
   decrementing the count of responses in the discovery prefixes table of the network node upon receipt of a data packet in response to the first interest packet.

3. The system of claim 2, wherein the network node is further configured to delete the entry in the discovery prefixes table if the count reaches zero or the timeout period has elapsed.

4. The system of any of claim 1, wherein the network node is configured to receive the first interest packet by:
   checking at least one field of the first interest packet to determine whether the interest packet is a discovery interest packet; and
   identifying the interest packet as a discovery interest packet based on a value of at least one field, wherein identification of the interest packet as a discovery interest packet enables the network node to receive and forward the data packets in response to the first interest packet.

5. The system of claim 4, wherein the at least one field is the name field, and wherein the value is a predefined keyword within the name field.

6. The system of claim 4, wherein the at least one field is a discovery packet field comprising a single bit, and wherein identifying the first interest packet as a discovery interest packet comprises identifying the first interest packet as a discovery interest packet if the single bit indicates that the first interest packet is a discovery packet.

7. The system of any of claim 1, wherein the network node is further configured to receive, in response to the second interest packet, a result data packet specifying a name for retrieving results of the executed named function and forward the result data packet to the client node.

8. At least one non-transitory machine readable medium including instructions that, when executed by processing circuitry, cause the processing circuitry to perform operations comprising:
   receiving, at a network node of an information centric network (ICN) network, a first interest packet comprising a name field indicating a named function and one or more constraints specifying compute requirements for a computing node to execute the named function, the first interest packet received from a client node;
   identifying a plurality of computing nodes that satisfy the compute requirements for executing the named function;
   forwarding the first interest packet to at least some of the plurality of computing nodes;
   receiving data packets from at least some of the plurality of computing nodes in response to the first interest packet;
   selecting one of the plurality of computing nodes based on the received data packets; and
   sending a second interest packet to the selected one of the plurality of computing nodes instructing the selected one of the plurality of compute nodes to execute the named function.

9. The at least one non-transitory machine readable medium of claim 8, wherein selecting the one of the plurality of computing nodes that satisfy the compute requirements comprises:

forwarding each of the received data packets to the client node; and receiving, from the client node, the second interest packet specifying the selected one of the plurality of computing nodes.

10. The at least one non-transitory machine readable medium of claim 8, wherein selecting the one of the plurality of computing nodes further comprises:

selecting, by the network node, the one of the plurality of computing nodes based on the received data packets and a stored policy of the network node.

11. The at least one non-transitory machine readable medium of any of claim 8, wherein forwarding the first interest packet to each of the plurality of computing nodes comprises:

storing an entry for the first interest packet in a discovery prefixes table of the network node, the entry including a count of responses and a timeout period specified by the first interest packet; and decrementing the count of responses in the discovery prefixes table of the network node upon receipt of a data packet in response to the first interest packet.

12. The at least one non-transitory machine readable medium of claim 11, wherein the operations comprise:

deleting the entry in the discovery prefixes table if the count reaches zero or the timeout period has elapsed.

13. The at least one non-transitory machine readable medium of any of claim 8, wherein receiving the first interest packet comprises:

checking at least one field of the first interest packet to determine whether the interest packet is a discovery interest packet; and identifying the interest packet as a discovery interest packet based on a value of at least one field, wherein identification of the interest packet as a discovery interest packet enables the network node to receive and forward the data packets in response to the first interest packet.

14. The at least one non-transitory machine readable medium of claim 13, wherein the at least one field is the name field, and wherein the value is a predefined keyword within the name field.

15. The at least one non-transitory machine readable medium of claim 13, wherein the at least one field is a discovery packet field comprising a single bit, and wherein identifying the first interest packet as a discovery interest packet comprises identifying the first interest packet as a discovery interest packet if the single bit indicates that the first interest packet is a discovery packet.

16. A method for enabling dynamic compute in information centric networking (ICN), the method comprising:

receiving, at a network node of an ICN network, a first interest packet comprising a name field indicating a named function and one or more constraints specifying compute requirements for a computing node to execute the named function, the first interest packet received from a client node;

identifying a plurality of computing nodes that satisfy the compute requirements for executing the named function;

forwarding the first interest packet to at least some of the plurality of computing nodes;

receiving data packets from at least some of the plurality of computing nodes in response to the first interest packet;

selecting one of the plurality of computing nodes based on the received data packets; and sending a second interest packet to the selected one of the plurality of computing nodes instructing the selected one of the plurality of compute nodes to execute the named function.

17. The method of claim 16, wherein selecting the one of the plurality of computing nodes that satisfy the compute requirements comprises:

forwarding each of the received data packets to the client node; and receiving, from the client node, the second interest packet specifying the selected one of the plurality of computing nodes.

18. The method of claim 16, wherein selecting the one of the plurality of computing nodes further comprises:

selecting, by the network node, the one of the plurality of computing nodes based on the received data packets and a stored policy of the network node.

19. The method of any of claim 16, wherein forwarding the first interest packet to each of the plurality of computing nodes comprises:

storing an entry for the first interest packet in a discovery prefixes table of the network node, the entry including a count of responses and a timeout period specified by the first interest packet; and decrementing the count of responses in the discovery prefixes table of the network node upon receipt of a data packet in response to the first interest packet.

20. The method of claim 19, further comprising:

deleting the entry in the discovery prefixes table if the count reaches zero or the timeout period has elapsed.

21. The method of any of claim 16, wherein receiving the first interest packet comprises:

checking at least one field of the first interest packet to determine whether the interest packet is a discovery interest packet; and identifying the interest packet as a discovery interest packet based on a value of at least one field, wherein identification of the interest packet as a discovery interest packet enables the network node to receive and forward the data packets in response to the first interest packet.

22. The method of claim 20, wherein the at least one field is the name field, and wherein the value is a predefined keyword within the name field.

23. The method of claim 20, wherein the at least one field is a discovery packet field comprising a single bit, and wherein identifying the first interest packet as a discovery interest packet comprises identifying the first interest packet as a discovery interest packet if the single bit indicates that the first interest packet is a discovery packet.

24. The method of any of claim 16, further comprising receiving, in response to the second interest packet, a result data packet specifying a name for retrieving results of the executed named function.

* * * * *